United States Patent
Robertson et al.

(10) Patent No.: US 6,972,788 B1
(45) Date of Patent: Dec. 6, 2005

(54) PROJECTION DISPLAY FOR A AIRCRAFT COCKPIT ENVIRONMENT

(75) Inventors: Richard L. Robertson, Cedar Rapids, IA (US); Mark A. Woytassek, Cedar Rapids, IA (US); Brian P. Dehmlow, Canton, MI (US)

(73) Assignee: Rockwell Collins, Cedar Rapids, IA (US)

( * ) Notice: Subject to any disclaimer, the term of this patent is extended or adjusted under 35 U.S.C. 154(b) by 654 days.

(21) Appl. No.: 10/058,604

(22) Filed: Jan. 28, 2002

(51) Int. Cl.[7] .............................. H04N 5/64; H04N 9/31
(52) U.S. Cl. ...................... 348/187; 348/123; 348/744; 348/748; 348/825; 359/630; 353/119; 345/7; 454/76
(58) Field of Search ................................ 348/123, 187, 348/744–745, 748, 825, 12; 359/630–631; 353/119; 345/7; 454/71, 76; H04N 5/64, H04N 9/31

(56) References Cited

U.S. PATENT DOCUMENTS

| 4,352,124 | A | * | 9/1982 | Kline | 348/61 |
| 5,574,497 | A | * | 11/1996 | Henderson et al. | 348/144 |
| 6,043,854 | A | | 3/2000 | Scott | |
| 6,384,875 | B2 | * | 5/2002 | Bertagna | 348/825 |
| 6,513,937 | B1 | * | 2/2003 | Dehmlow | 353/94 |
| 6,666,896 | B1 | * | 12/2003 | Peng | 353/94 |
| 2002/0171927 | A1 | * | 11/2002 | Barnes, III | 359/451 |

* cited by examiner

Primary Examiner—Brian P. Yenke
(74) Attorney, Agent, or Firm—Nathan O. Jensen; Kyle Eppele

(57) ABSTRACT

A projection display is provided according to one embodiment of the invention. The projection display includes a hollow case including a window opening, a screen formed on one portion of the case, and at least one mirror internally mounted to the case at a position to reflect light from the window opening to the screen. The projection display further includes a window mounted in the window opening. The projection display further includes an optical engine mounted to the case. The optical engine is positioned over the window and oriented so that emitted light from the optical engine is directed onto the at least one mirror. The projection display further includes a diaphragm internally attached to the case and dividing an internal volume of the case into a first portion and a second portion. The projection display further includes a gas filling the second portion of the case at an overpressure and a vent communicating with the first portion of the case and communicating with an external environment. The vent at least partially equalizes the overpressure of the second portion with a pressure of the external environment.

18 Claims, 2 Drawing Sheets

PROJECTION DISPLAY FOR A AIRCRAFT COCKPIT ENVIRONMENT

FIELD OF THE INVENTION

The present invention relates generally to projection display devices, and more particularly to a projection display for an aircraft cockpit environment.

BACKGROUND OF THE INVENTION

Modern aircraft cockpit instrumentation includes many complex electronic systems, including avionics, navigation systems, communications, engine and system gauges, etc. They are visual instrument systems that the aircraft crew use in operating the aircraft. Therefore, proper operation of all cockpit instruments is of the greatest importance. In addition, the cockpit instrumentation must be highly reliable in order to provide safe, reliable, and economical air travel.

Prior art aircraft cockpit instrumentation has used projection displays. A projection display includes an optical image engine that creates and projects an electronically created image onto a screen. The resultant image can be viewed by one or more of the crew. The projection display may include one or more mirrors to reflect the image onto a screen at a desired position. The projection display can create any manner of visual display, including instrument representations, navigation displays, aircraft attitude displays, etc. In addition, the projection display may be switched between a plurality of display types.

However, the projection displays of the prior art have drawbacks. In the prior art, the optical engine portion of the projected display is generally mounted at the rear of the projection display device. The optical engine is therefore located well behind the instrument panel of an aircraft. The result is difficult maintenance of the projection display and difficult replacement of the optical engine. Anyone familiar with maintenance of electrical and mechanical systems is aware that complicated and inconveniently installed machinery is harder to repair correctly and therefore more prone to failure.

In another drawback, the prior art projection display is not sealed. Because the cockpit environment is not completely clean, dust and dirt may float around and may be stirred up by ventilation or by flight maneuvers. The dirt may work its way into the prior art projection display and cause degraded performance or even failure of the device. In addition, the cockpit environment may contain moisture which can cause corrosion or condensation that interferes with the display.

What is needed therefore are improvements to aircraft cockpit projection displays.

SUMMARY OF THE INVENTION

A projection display is provided according to one embodiment of the invention. The projection display comprises a hollow case including a window opening, a screen formed on one portion of the case, and at least one mirror internally mounted to the case at a position to reflect light from the window opening to the screen. The projection display further comprises a window mounted in the window opening. The projection display further comprises an optical engine mounted to the case. The optical engine is positioned over the window and oriented so that emitted light from the optical engine is directed onto the at least one mirror. The projection display further comprises a diaphragm internally attached to the case and dividing an internal volume of the case into a first portion and a second portion. The projection display further comprises a gas filling the second portion of the case at an overpressure and a vent communicating with the first portion of the case and communicating with an external environment. The vent at least partially equalizes the overpressure of the second portion with a pressure of the external environment.

According to a second embodiment the projection display comprises a hollow case including a window opening, a screen formed on one portion of the case, and at least one mirror internally mounted to the case at a position to reflect light from the window opening to the screen. The projection display further comprises a seal positioned in the window opening and a window mounted in the window opening and sealingly retained therein by the seal. The projection display further comprises an optical engine removably mounted to the case. The optical engine is positioned over the window and oriented so that emitted light from the optical engine is directed onto the at least one mirror. The projection display further comprises a flexible dust boot interposed between the optical engine and the case. The projection display further comprises a diaphragm internally attached to the case and dividing an internal volume of the case into a first portion and a second portion. The projection display further comprises a vent opening or a sealable port formed in the case and positioned in the first portion and communicating with the first portion. The vent opening allows atmospheric air into the first portion. The projection display further comprises a dry, inert gas filling the second portion of the case at an overpressure and two sealable ports communicating with an interior of the second portion of the case. The first port comprises an inlet for introducing the dry, inert gas into the second portion of the case. The second port comprises an outlet for removing atmospheric air from the second portion of the case during the introduction of the dry, inert gas.

A method of forming a projection display comprises the steps of forming a hollow case including a window opening and a screen and affixing at least one mirror to an internal surface of the case at a position to reflect light from the window opening onto the screen. The method further comprises the steps of applying a seal to the window opening and sealingly mounting a window in the window opening and retained in the window opening by the seal. The method further comprises the steps of mounting an optical engine to the case. The optical engine is positioned over the window and oriented so that emitted light from the optical engine is directed onto the at least one mirror. The method further comprises the steps of providing a flexible dust boot between the optical engine and the case. The method further comprises the steps of sealingly attaching a diaphragm to an interior region of the case. The diaphragm divides an internal volume of the case into a first portion and a second portion. The method further comprises the steps of supplying a dry, inert gas to the second portion of the case using a first port, evacuating atmospheric air from the second portion of the case using a second port, and pressurizing the second portion of the case with the dry, inert gas to an overpressure.

The above and other features and advantages of the present invention will be further understood from the following description of the preferred embodiments thereof, taken in conjunction with the accompanying drawings.

DETAILED DESCRIPTION

Figure 1:
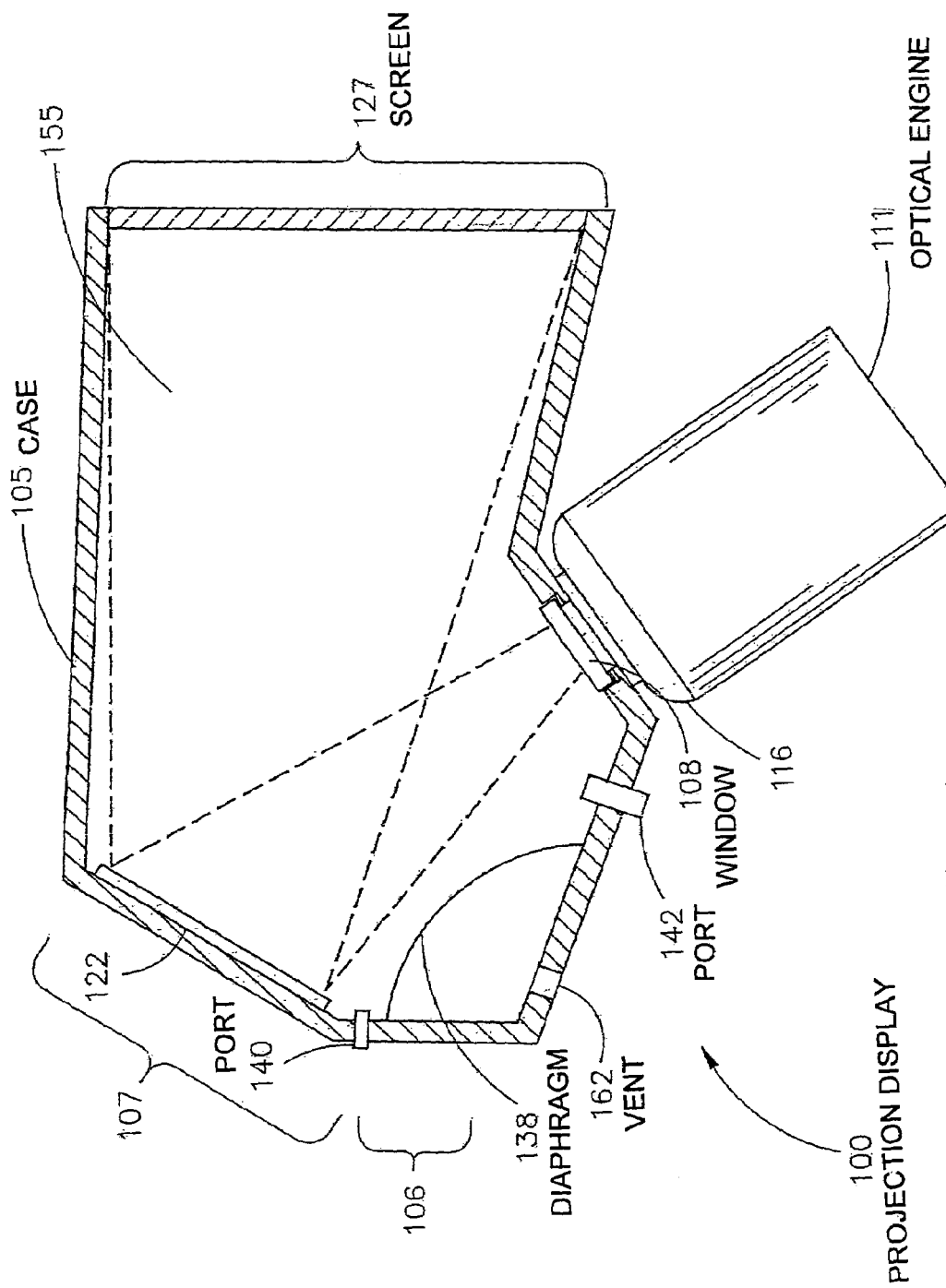
FIG. 1 shows a projection display according to one embodiment of the invention.

FIG. 1 shows a projection display 100 according to one embodiment of the invention. The projection display 100 includes a case 105, a window 108, an optical engine 111, a dust boot 116, at least one mirror 122, a screen 127, a seal 135, a diaphragm 138, two external ports 140 and 142, an inert gas mixture 155, and an optional vent opening 162.

The case 105 is hollow and when the projection display 100 is fully assembled the case 105 is capable of containing a gas or gas mixture at an appropriate overpressure condition. The case 105 may be formed of a strong, light, non-porous material such as: aluminum, titanium, composite material, etc. The overpressure can be as little as about 5 pounds per square inch (psi), but in addition, the case 105 may support overpressures due to altitude changes from sea level to very high altitudes. The case 105 includes the screen 127, which may be translucent and may be formed as one end wall of the case 105. At least one first surface mirror 122 is placed in the back surface of the case 105 in a region and at an angle to direct the image from the optical engine 111 to be focused onto the screen 127. More than one mirror may be used, as required or desired.

Figure 2:
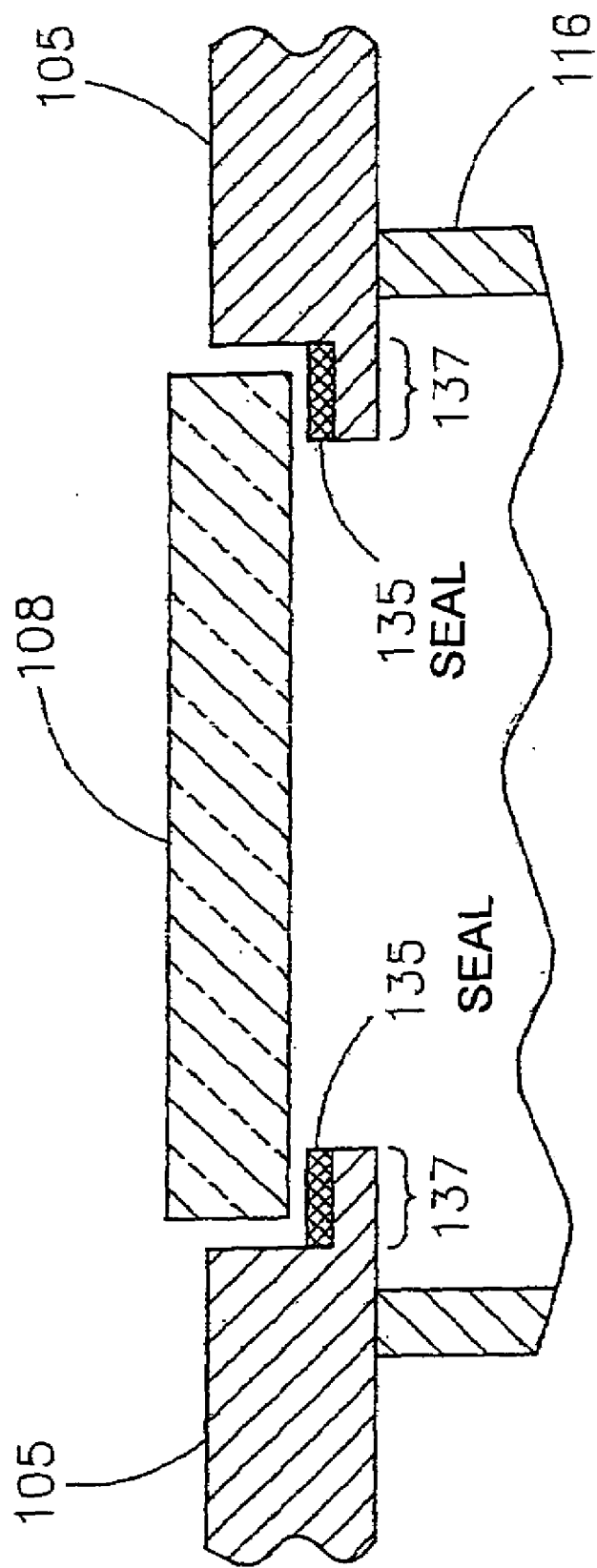
FIG. 2 shows detail of the mounting of the window in the case.

FIG. 2 shows detail for one method of the mounting of the window 108 in the case 105. The window 108 is placed in an opening in the case 105 and is sealed therein by a seal 135. The seal 135 may be rubber, nylon, silicon, etc. The seal 135 is positioned between the window 108 and the window opening of the case 105, on an extending lip 137. The seal 135 therefore creates an essentially air-tight seal between the window 108 and the case 105. The window 108 is transparent, and may be glass or plastic, for example.

The optical engine 111 may be any type of common projection display optical engine. The optical engine 111 mounts to the outside of the case 105, and is substantially centered on the window 108, wherein the image generated by the optical engine 111 passes through the window 108. The dust boot 116 is a flexible ring that is positioned between the optical engine 111 and the case 105 and prevents dust from getting in between the optical engine 111 and the window 108. The dust boot 116 may be formed of any manner of compliant material. As a result, the optical path of the emitted light is fully contained within the sealed projection display 100.

The diaphragm 138 may be any type of flexible membrane, such as a rubber membrane for example. The diaphragm 138 is internally attached to the case 105 and may flex in response to pressure within the case 105. As a result, the diaphragm 138 divides an internal volume of the case 105 into a first portion 106 and a second portion 107. Behind the diaphragm may be the optional vent opening 162 in the case 105 that allows the cabin air environment to enter into the small region covered by the diaphragm 138 (i.e., the first portion 106). The vent opening 162 is located in the first portion 106 and allows atmospheric air to enter or leave the first portion 106. The diaphragm 138 may flex in order to accommodate cabin air pressure differences. The diaphragm 138 therefore may at least partially equalize the overpressure in the case 105 with a pressure of the external environment. This minimizes strain on the seals of the projection display 100 due to changes in the cabin air pressure.

The two external ports 140 and 142 may be sealable and may be used to admit gas into and evacuate gas from the second portion 107 of the case 105. During manufacture, a first port 140 may be used to introduce an inert gas mixture, while a second port 142 may be used to evacuate atmospheric air. Therefore, the two ports 140 and 142 may be used to create an overpressure inert gas atmosphere inside the second portion 107 of the case 105 during manufacture. The two ports may then be closed in order to maintain the overpressure inert gas atmosphere in the second portion 107. The inert gas mixture 155 may be any type of dry inert gas, such as nitrogen, for example, or may be a mixture of gases. The overpressure is maintained in order to prevent moisture and atmospheric air from entering the projection display 100.

It should be understood that although two ports are discussed above, the projection display 100 may be constructed with only one port. In a single port embodiment, the case 105 may be substantially evacuated and then filled to a slight overpressure using only one port. The drawback of a single port embodiment is that the evacuation and pressurization will take longer and the evacuation of atmospheric air may not be as complete as in a two port embodiment.

The projection display 100 may be manufactured by forming a hollow case 105, including a window opening and a screen 127. At least one mirror 122 is affixed to an internal surface of the case 105 at a position to reflect light from the window opening onto the screen 127. A seal 135 is applied to the window opening of the case 105, and a window 108 is applied to the window opening, wherein the seal 135 sealingly retains the window 108 in the window opening. An optical engine 111 is mounted to the case, with the optical engine 111 being positioned over the window 108 and oriented so that emitted light from the optical engine 111 is directed onto the at least one mirror 122. A flexible dust boot is provided between the optical engine 111 and the case 105. A diaphragm 138 is sealingly attached to an interior region of the case 105, with the diaphragm 138 dividing an internal volume of the case 105 into a first portion 106 and a second portion 107. A dry, inert gas mixture is supplied to the second portion 107 of the case 105 using a first port 140. Atmospheric air in the second portion 107 of the case 105 is evacuated substantially simultaneously using a second port 142. The case 105 is pressurized with the dry, inert gas mixture 155 to a slight overpressure.

The projection display 100 according to the invention presents several benefits. Due to the pressure regulation provided by the diaphragm 138, there is less stress on the case 105 and on the sealing components. Therefore, the projection display 100 is less likely to leak and will last longer. Moreover, the inert dry gas interior environment will prevent corrosion and will prevent condensation within the case 105. In addition, the optical engine 111 is mounted at a lower front region of the projection display 100. The mounting arrangement therefore provides easy access to the optical engine 111 from the aircraft cockpit. The mount therefore allows easy maintenance and replacement. Moreover, due to the sealed nature of the projection display 100, dirt or moisture cannot get inside the casing. Problems such as corrosion, condensation and fogging, dirt in working components, etc., are thereby prevented.

While the invention has been described in detail above, the invention is not intended to be limited to the specific embodiments as described. It is evident that those skilled in the art may now make numerous uses and modifications of and departures from the specific embodiments described herein without departing from the inventive concepts.

We claim:

1. A projection display, comprising:
   a hollow case including a window opening;

a screen formed on one portion of said case;
at least one mirror internally mounted in said case at a position to reflect light from said window opening to said screen;
a window mounted in said window opening;
an optical engine mounted to said case, with said optical engine being positioned over said window and oriented so that emitted light from said optical engine is directed onto said at least one mirror;
a diaphragm internally attached to said case and dividing an internal volume of said case into a first portion and a second portion;
a gas filling said second portion of said case at an overpressure; and
a vent communicating with said first portion of said case and communicating with an external environment to at least partially equalize said overpressure of said second portion with a pressure of said external environment.

2. The projection display of claim 1, wherein said diaphragm comprises a flexible diaphragm.

3. The projection display of claim 1, said vent allows atmospheric air into said first portion.

4. The projection display of claim 1, wherein said at least one port comprises two ports, with a first port comprising an inlet for introducing said dry, inert gas into said second portion of said case and a second port comprising an outlet for removing atmospheric air from said second portion of said case during said introducing of said dry, inert gas.

5. The projection display of claim 1, wherein said gas comprises a dry, inert gas.

6. The projection display of claim 1, wherein said gas comprises nitrogen.

7. The projection display of claim 1, wherein said optical engine is positioned below said screen.

8. The projection display of claim 1, wherein said optical engine is removably mounted to said case.

9. The projection display of claim 1, further comprising a flexible dust boot interposed between said optical engine and said case.

10. The projection display of claim 1, further comprising a seal positioning in said window opening.

11. A projection display, comprising:
a hollow case including a window opening;
a screen formed on one portion of said case;
at least one mirror internally mounted to said case at a position to reflect light from said window opening to said screen;
a seal positioned in said window opening;
a window mounted in said window opening and sealingly retained therein by said seal;
an optical engine removably mounted to said case, with said optical engine being positioned over said window and oriented so that emitted light from said optical engine is directed onto said at least one mirror;
a flexible dust boot interposed between said optical engine and said case;
a diaphragm internally attached to said case and dividing an internal volume of said case into a first portion and a second portion;
a vent opening formed in said case and positioned in said first portion and communicating with said first portion, with said vent opening allowing atmospheric air into said first portion;
a dry, inert gas filling said second portion of said case at an overpressure; and
two sealable ports communicating with an interior of said second portion of said case, with a first port comprising an inlet for introducing said dry, inert gas into said second portion of said case and a second port comprising an outlet for removing atmospheric air from said second portion during said introducing of said dry, inert gas.

12. The projection display of claim 11, wherein said diaphragm comprises a flexible diaphragm.

13. The projection display of claim 11, wherein said dry, inert gas comprises nitrogen.

14. The method of claim 11, wherein said optical engine is positioned below said screen.

15. A method of forming a projection display, comprising the steps of:
forming a hollow case including a window opening and a screen;
affixing at least one mirror to an internal surface of said case at a position to reflect light from said window opening onto said screen;
applying a seal to said window opening;
sealingly mounting a window in said window opening and retained in said window opening by said seal;
mounting an optical engine to said case, with said optical engine being positioned over said window and oriented so that emitted light from said optical engine is directed onto said at least one mirror;
providing a flexible dust boot between said optical engine and said case;
sealingly attaching a diaphragm to an interior region of said case, said diaphragm dividing an internal volume of said case into a first portion and a second portion;
supplying a dry, inert gas to said second portion of said case using a first port;
evacuating atmospheric air from said second portion of said case using a second port; and
pressurizing said second portion of said case with said dry, inert gas to an overpressure.

16. The method of claim 15, further comprising forming a vent opening in said case and positioned in said first portion and communicating with said first portion, with said vent opening allowing atmospheric air into said first portion.

17. The method of claim 15, wherein the step of supplying a dry, inert gas comprises supplying nitrogen.

18. The method of claim 15, wherein said optical engine is mounted to said case in a position below said screen.

* * * * *